United States Patent
Jung et al.

(10) Patent No.: US 11,175,198 B2
(45) Date of Patent: Nov. 16, 2021

(54) SYSTEM FOR SENSING AND NOTIFYING MATERIAL LEAKAGE

(71) Applicant: DREAM FACTORY CO., LTD., Seongnam-si (KR)

(72) Inventors: Won Suk Jung, Gwangju-si (KR); Min Hwan Hyun, Seoul (KR)

(73) Assignee: DREAM FACTORY CO., LTD., Gyeonggi-Do (KR)

( * ) Notice: Subject to any disclaimer, the term of this patent is extended or adjusted under 35 U.S.C. 154(b) by 68 days.

(21) Appl. No.: 16/617,933

(22) PCT Filed: May 28, 2018

(86) PCT No.: PCT/KR2018/006029
§ 371 (c)(1),
(2) Date: Nov. 27, 2019

(87) PCT Pub. No.: WO2018/221909
PCT Pub. Date: Dec. 6, 2018

(65) Prior Publication Data
US 2021/0140844 A1    May 13, 2021

(30) Foreign Application Priority Data
May 29, 2017 (KR) .......................... 10-2017-0066293

(51) Int. Cl.
*G01M 3/04* (2006.01)
*G08B 21/12* (2006.01)
(Continued)

(52) U.S. Cl.
CPC ............... *G01M 3/04* (2013.01); *G08B 21/12* (2013.01); *G08B 25/10* (2013.01); *G08B 29/185* (2013.01)

(58) Field of Classification Search
CPC ......... G01M 3/04; G08B 21/12; G08B 25/10; G08B 29/185; G08B 21/20
(Continued)

(56) References Cited

U.S. PATENT DOCUMENTS

2006/0152355 A1   7/2006  Suenbuel et al.
2020/0386816 A1*  12/2020 Jeong .................... G01R 31/396

FOREIGN PATENT DOCUMENTS

JP    2013-068420    4/2013
KR    20-0301031     1/2003
(Continued)

OTHER PUBLICATIONS

International Search Report, issued in the corresponding PCT application No. PCT/KR2018/006029, dated Aug. 20, 2018, 5 pages.

*Primary Examiner* — John A Tweel, Jr.
(74) *Attorney, Agent, or Firm* — Hamre, Schumann, Mueller & Larson, P.C.

(57) ABSTRACT

A system for sensing and notifying material leakage includes a material leakage sensor provided as plural ones within a specific facility and configured to sense whether a material including a liquid or a gas leaks to the outside of a joint portion or an opening/closing portion of the equipment located inside or outside of the specific facility; and a controller configured to receive sensing information sensed by the material leakage sensor and transmit a material leakage notification to a security company device through a wireless communication module based on the sensing information. The security company device is a device of a security company in charge of security or guard for the specific facility.

13 Claims, 7 Drawing Sheets

(51) Int. Cl.
*G08B 29/18* (2006.01)
*G08B 25/10* (2006.01)

(58) Field of Classification Search
USPC ...................................................... 73/40.5 R
See application file for complete search history.

(56) References Cited

FOREIGN PATENT DOCUMENTS

| | | |
|---|---|---|
| KR | 20-0382262 | 4/2005 |
| KR | 10-1069027 | 9/2011 |
| KR | 10-1152595 | 6/2012 |
| KR | 10-1385211 | 4/2014 |
| KR | 10-1557745 | 10/2015 |
| KR | 10-1562650 | 10/2015 |
| KR | 10-2016-0019577 | 2/2016 |
| KR | 10-2016-0121706 | 10/2016 |
| KR | 10-1686587 | 12/2016 |
| KR | 10-2017-0013811 | 2/2017 |
| WO | 2017/086981 A1 | 5/2017 |

\* cited by examiner

SYSTEM FOR SENSING AND NOTIFYING MATERIAL LEAKAGE

TECHNICAL FIELD

The present disclosure relates to a system for sensing and notifying material leakage.

BACKGROUND

In general, a leakage sensor is installed around a container that contains a gas or a pipe that transports a liquid or gas in an industrial facility or plant using a liquid or a gas to sense the leakage of gas or toxic material.

Such a leakage sensor is installed on the bottom surface of a product or the floor surface of a plant and wire connected to a control system. The control system transmits sensor information to a control center, and then a manager of the control center can check the current status of material leakage.

However, a conventional leakage sensor may not transmit an appropriate notification even when the leakage of material occurs. That is, during working hours of a staff member in charge of managing the facility, a notification can be transmitted to the control system, but if the leakage of material occurs out of working hours, the system cannot quickly notify the occurrence of the material leakage to the staff member in charge, and, thus, prompt action cannot be taken.

The leakage sensor may be wire connected to the control system, which causes inconvenience in installation and incurs installation costs. Otherwise, the leakage sensor may be wireless connected to the control system, which requires an expensive wireless communication module that enables a communication connection from the leakage sensor to the control system distant from the leakage sensor and thus incurs high installation costs.

DISCLOSURE OF THE INVENTION

Problems to be Solved by the Invention

To solve the above-described problem, some embodiments of the present disclosure provide a system for sensing and notifying material leakage that enables communication between multiple material leakage sensors and a controller and also enables the controller to directly notify the leakage of material to a security company device by using a long-range wireless communication module.

Means for Solving the Problems

According to an aspect of the present disclosure, a system for sensing and notifying material leakage includes a material leakage sensor provided as plural ones within a specific facility and configured to sense whether a material including a liquid or a gas leaks to the outside of a joint portion or an opening/closing portion of the equipment located inside or outside of the specific facility; and a controller configured to receive sensing information sensed by the material leakage sensor and transmit a material leakage notification to a security company device through a wireless communication module based on the sensing information. The security company device is a device of a security company in charge of security or guard for the specific facility.

According to another aspect of the present disclosure, a system for sensing and notifying material leakage includes a controller configured to receive sensing information from a material leakage sensor, which is provided as plural ones within a specific facility and configured to sense whether a material including a liquid or a gas leaks to the outside of a joint portion or an opening/closing portion of the equipment located inside or outside of the specific facility, and transmit a material leakage notification to a security company device through a wireless communication module based on the sensing information. The security company device is a device of a security company in charge of security or guard for the specific facility.

Effects of the Invention

According to the present disclosure, most general plants or facilities engage a security company to prevent theft or manage security and entrust security to the security company. A system for sensing and notifying material leakage according to the present disclosure enables an event of material leakage in a plant to be immediately notified to a security company and lets the security system cope with the accident. Thus, it is possible to take prompt action against the event of material leakage. Further, a controller can directly notify the leakage of material to a security company device by using a long-range wireless communication module without passing through a control center. Thus, it is possible to improve efficiency in management and reduce facility maintenance expenses.

BEST MODE FOR CARRYING OUT THE INVENTION

Figure 1:
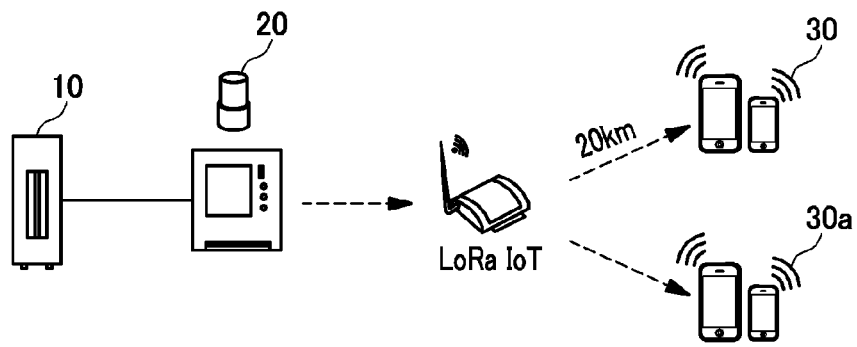
FIG. 1 is a configuration view provided to explain a system for sensing and notifying material leakage according to an embodiment of the present disclosure.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Figure 2:
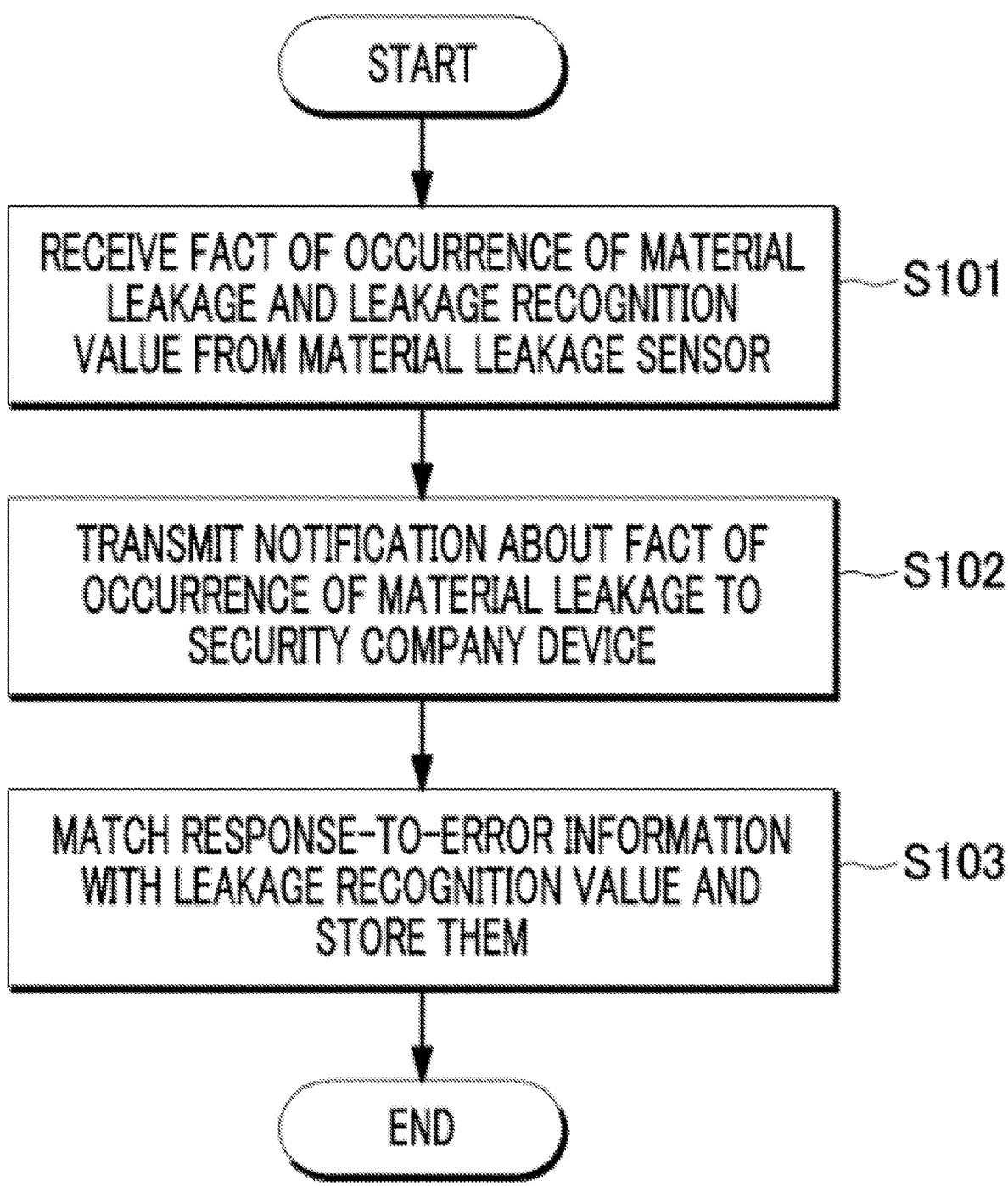
FIG. 2 is a flowchart provided to explain a method of sensing the leakage of material according to an embodiment of the present disclosure.

FIG. 1 is a configuration view provided to explain a system for sensing and notifying material leakage according to an embodiment of the present disclosure. FIG. 2 is a flowchart provided to explain a method of sensing the leakage of material according to an embodiment of the present disclosure.

Referring to FIG. 1, the system for sensing and notifying material leakage according to an embodiment of the present disclosure may include a material leakage sensor 10 provided as plural ones within a specific facility and configured to sense whether a material including a liquid or a gas leaks to the outside of a joint portion or an opening/closing portion of the equipment located inside or outside of the specific facility, and a controller 20 configured to receive sensing information sensed by the material leakage sensor 10 and transmit a material leakage notification to a security company device 30 through a wireless communication module based on the sensing information.

A system for sensing and notifying material leakage according to another aspect of the present disclosure may be provided as plural ones within a specific facility and includes the controller 20 configured to receive sensing information from the material leakage sensor 10 configured to sense whether a material including a liquid or a gas leaks to the outside of a joint portion or an opening/closing portion of the equipment located inside or outside of the specific facility and transmit a material leakage notification to the security company device 30 through a wireless communication module based on the sensing information.

Herein, the security company device 30 is a device of a security company in charge of security or guard for the specific facility. Further, the security company device 30 may be specified as a mobile device of a staff member of the security company in charge of security or guard. When the security company device 30 receives the material leakage notification, it may display a message of the material leakage notification and also provide the notification by at least one of vibration and sound.

In this case, desirably, the wireless communication module may use Long Range (LoRa) communication which is a low-power wide-area wireless communication technology, but may not be limited thereto.

For example, the material leakage sensor 10 may transmit sensing information to the controller 20 only when the leakage of material is sensed. For another example, the material leakage sensor 10 may transmit, to the controller 20, all sensing information sensed when the leakage of material is sensed or not sensed. Then, the controller 20 that has received the sensing information may transmit a material leakage notification to the security company device 30 or a plant manager device 30a through a long-range wireless communication module only when the leakage of material is sensed. For example, the manager may receive the material leakage notification through the device 30 or 30a by vibration and text in the form of a disaster warning message. In this case, the security company device 30 refers to a device of a security company manager, and the plant manager device 30a refers to a device of a plant manager. That is, they may refer to devices such as a PC of a control system or a smartphone or tablet PC of the manager.

Therefore, unlike a conventional system, the controller 20 directly transmits the material leakage notification to the security company device 30 without passing through a control center. Thus, it is possible to quickly check whether the leakage of material occurs.

Specifically, the material leakage sensor 10 may be wire connected to the controller 20 and may transmit the sensing information to the controller 20. For example, the sensing information may include a leakage recognition value detected when the leakage of material is sensed. That is, the material leakage sensor 10 may transmit, to the controller 20, sensing information including the leakage recognition value generated only when the leakage of material is sensed by the material leakage sensor 10 and the fact of the occurrence of material leakage. For another example, the sensing information may also include a leakage recognition value detected when the leakage of material is not sensed. That is, the material leakage sensor 10 may transmit, to the controller 20, sensing information including all leakage recognition values detected when the leakage of material is sensed or not sensed by the material leakage sensor 10 and the fact of the occurrence of material leakage.

In this case, the controller 20 may accumulate and statistically process leakage recognition values, and when receiving, from the material leakage sensor 10, a leakage recognition value corresponding to the fact of the occurrence of material leakage, it may transmit a material leakage notification to the security company device 30. Further, the leakage recognition values may include at least one of a current value and a voltage value of the material leakage sensor 10.

The controller 20 may receive response-to-error information multiple times whenever the security company manager which possesses the security company device 30 verifies that a material leakage notification is an error. Further, the controller 20 may match the multiple response-to-error information received with leakage recognition values corresponding to material leakage notifications and then store them.

When the controller 20 receives a leakage recognition value matched with response-to-error information from the material leakage sensor 10, it does not transmit a material leakage notification to the security company device 30.

Referring to FIG. 2, as an additional embodiment, the controller 20 may receive the fact of the occurrence of material leakage and leakage recognition values (e.g., a current value or a voltage value of the sensor) from the material leakage sensor 10 (S101). Then, the controller 20 may transmit a notification about the fact of the occurrence of material leakage to the security company device 30 (S102). Then, the security company manager which possesses the security company device 30 may respond to the scene and determine whether the leakage of material occurs. In this case, if the security company manager determines that the leakage of material does not occur (i.e., response to error), response-to-error information indicative of the occurrence of error (no leakage) may be input into the controller 20. In this case, the controller 20 may match the received response-to-error information with a leakage recognition value corresponding to the material leakage notification and then store them (S103).

As such, in each case of a response to an error, the security company manager matches a leakage recognition value with response-to-error information and stores them in the controller 20. Thus, based on statistical data of matched and stored values, the controller 20 may determine that a leakage recognition value in a specific range is a response to an error (i.e., no material leakage) regardless of the fact of the occurrence of material leakage received from the material leakage sensor 10.

Therefore, when a leakage recognition value corresponding to the fact of the occurrence of material leakage received from the material leakage sensor 10 is in the range of response-to-error information, the controller 20 may not transmit a material leakage notification to the security company device 30.

Figure 3:
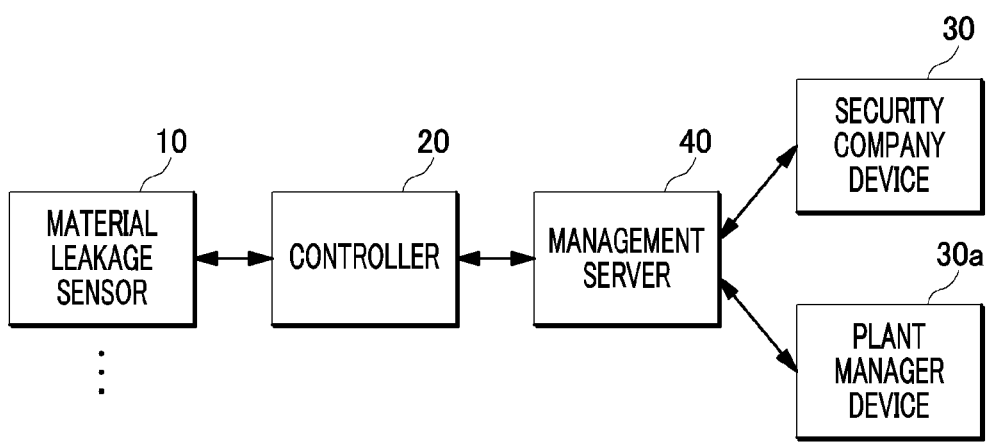
FIG. 3 is a configuration view provided to explain a system for sensing and notifying material leakage according to another embodiment of the present disclosure.
Figure 4:
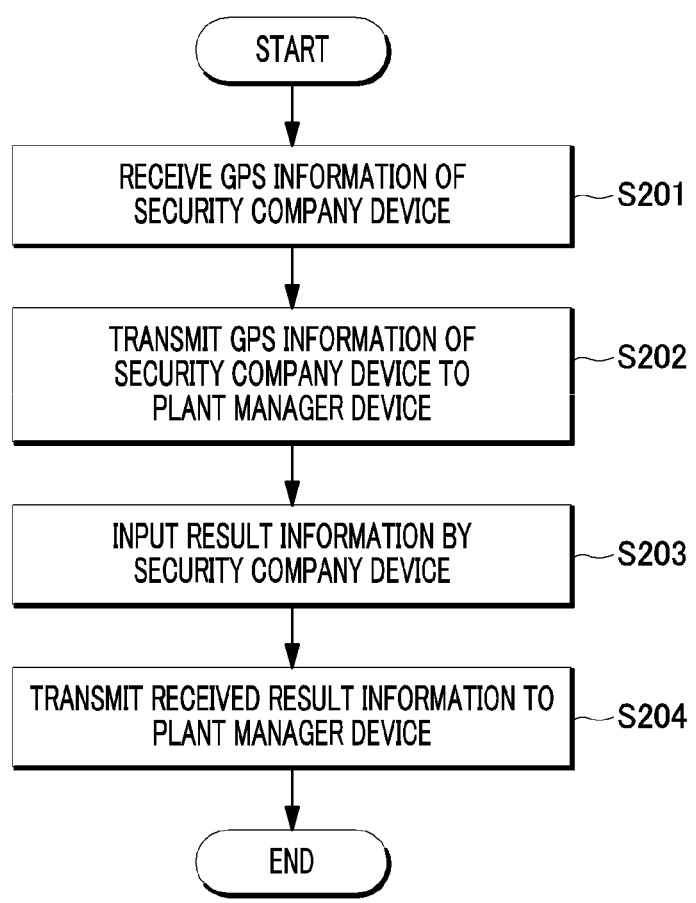
FIG. 4 is a flowchart provided to explain a method of sensing the leakage of material according to an additional embodiment of the present disclosure.
Figure 5:
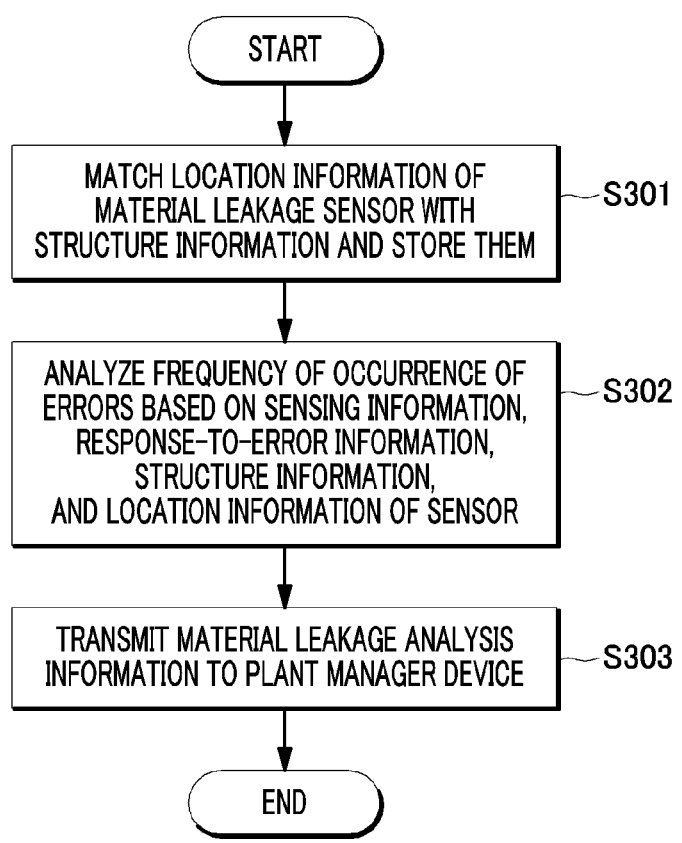
FIG. 5 is a flowchart provided to explain a method of sensing the leakage of material according to another additional embodiment of the present disclosure.

FIG. 3 is a configuration view provided to explain a system for sensing and notifying material leakage according to another embodiment of the present disclosure. FIG. 4 is a flowchart provided to explain a method of sensing the leakage of material according to an additional embodiment of the present disclosure. FIG. 5 is a flowchart provided to explain a method of sensing the leakage of material according to another additional embodiment of the present disclosure.

Hereafter, the system for sensing and notifying material leakage according to another embodiment of the present disclosure will be described with reference to FIG. 3. A detailed description of components identical in function to those described above with reference to FIG. 1 will be omitted.

Referring to FIG. 3, the system for sensing and notifying material leakage may further include a management server 40 that receives sensing information sensed by the material leakage sensor 10 and matches the sensing information with predetermined material leakage notification information and transmits them to the security company device 30 and the plant manager device 30a that receives GPS information of the security company device 30 in real time. Herein, the material leakage notification information may include a command signal to transmit a GPS module operation command signal, a vibration command signal, and GPS information to the management server 40.

For example, a program or an application for retrieving and executing a material leakage notification and material leakage notification information may be installed in the security company device 30. Further, a program or an application for retrieving and analyzing GPS information of the security company device 30 may be installed in the plant manager device 30a.

When the management server 40 receives result information including scene control and error recognition from the security company device 30, it may transmit the result information to the plant manager device 30a.

Further, the management server 40 periodically receives, from the material leakage sensor 10, live signals indicating that the material leakage sensor 10 normally operates, and when the management server 40 receives, from the security company device 30, a request for retrieval of the status of the material leakage sensor 10, the management server 40 may transmit status information of the material leakage sensor 10 to the security company device 30 based on a live signal of the material leakage sensor 10 selected by the security company device 30.

As an additional embodiment of the present disclosure, the following processes may be performed.

Referring to FIG. 4, the security company device 30 may receive, from the management server 40, sensing information of the material leakage sensor 10 and material leakage notification information including a command signal to transmit a GPS module operation command signal, a vibration command signal, and GPS information to the management server 40. As soon as the security company device 30 receives the material leakage notification information, the management server 40 may receive GPS information of the security company device 30 in real time (S201). Then, the management server 40 may transmit the GPS information of the security company device 30 to the plant manager device 30a (S202). Therefore, the plant manager device 30a can check the travel path and the current location of the security company manager which possesses the security company device 30. Then, the security company manager who has arrived at the scene and checked whether the leakage of material occurs may input result information, such as "scene control" or "error recognition", into the security company device 30 (S203). The management server 40 which has received the result information may transmit the result information to the plant manager device 30a (S204).

Therefore, the plant manager can check, through the plant manager device 30a, the travel path of the security company manager and a result of response to a material leakage in real time and thus efficiently manage and supervise the security company.

The management server 40 may match sensing information with location information of the material leakage sensor 10 that senses the leakage of material and information about a structure in which the material leakage sensor 10 is located and store them in a database, and the structure information may include a type, an age, and location of the structure.

The management server 40 may transmit, to the plant manager device 30a, material leakage analysis information analyzed based on the sensing information, the response-to-error information, the location information of the material leakage sensor 10, and the structure information, and the material leakage analysis information may include the frequency of occurrence of errors according to a type, an age, and location of the structure.

Referring to FIG. 5, as another additional embodiment, when a material leakage notification is generated, the management server 40 may match location information of the material leakage sensor 10 with information about a structure in which the material leakage sensor 10 is located and store them (S301). Then, the management server 40 may analyze the frequency of occurrence of errors based on accumulated sensing information, response-to-error information, structure information, and location information of the material leakage sensor 10 (S302). Thereafter, the management server 40 may transmit, to the plant manager device 30a, material leakage analysis information including the analyzed frequency of occurrence of errors according to a type, an age, and location of the structure (S303).

Therefore, the plant manager can check, through the plant manager device 30*a*, an analysis result indicative of how old a structure is when the possibility of occurrence of material leakage errors is high and where a structure is located when the possibility of occurrence of material leakage errors is high and thus can manage a structure with high possibility of occurrence of material leakage errors. Therefore, it is possible to prevent an accident involving the leakage of toxic material.

Figure 6:
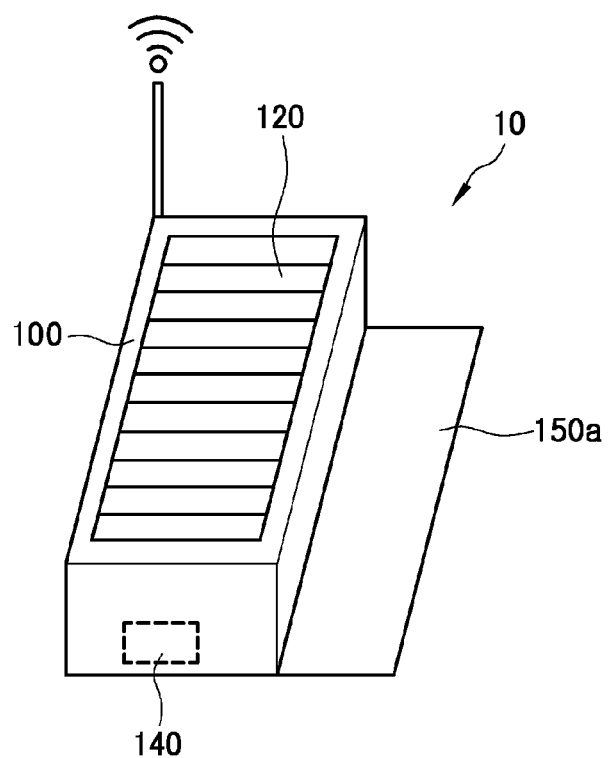
FIG. 6 is a configuration view provided to explain a material leakage sensor for sensing liquid leakage according to an embodiment of the present disclosure.

FIG. 6 is a configuration view provided to explain a material leakage sensor for sensing liquid leakage according to an embodiment of the present disclosure.

Figure 7:
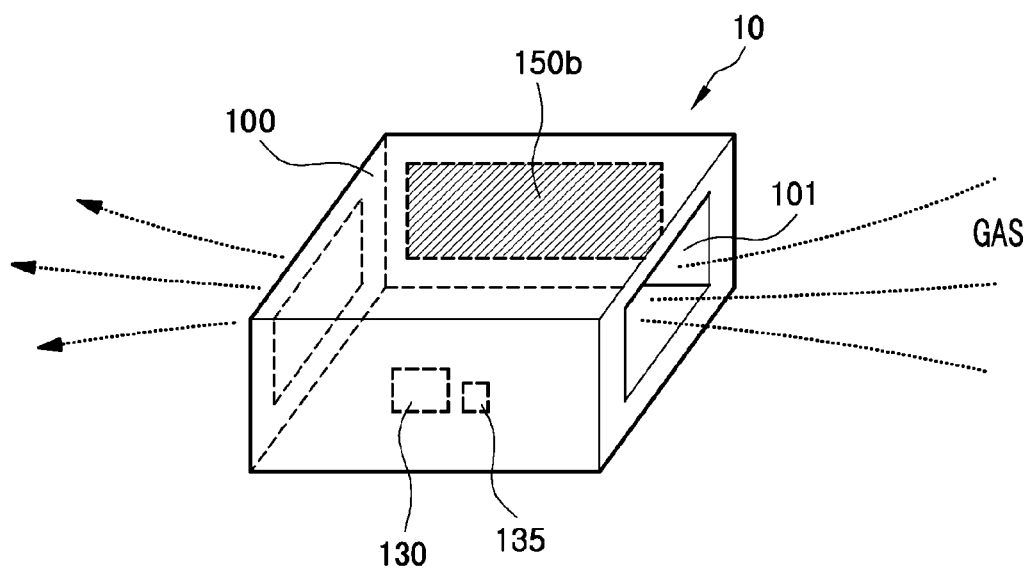
FIG. 7 is a configuration view provided to explain a material leakage sensor for sensing gas leakage according to another embodiment of the present disclosure.

FIG. 7 is a configuration view provided to explain a material leakage sensor for sensing gas leakage according to another embodiment of the present disclosure.

If the material leakage sensor 10 is configured as a device for sensing liquid leakage, it may be configured as described below.

Referring to FIG. 6, the material leakage sensor 10 may include a solar module 120 placed on an upper surface of a main body 100, and a liquid leakage sensing unit 150*a* including a film protruding to the outside from a lower part of the main body 100 and covering a circuit and a groove formed in a lower surface of the film to expose the circuit to the outside.

For example, the main body 100 may have a box shape, and the solar module 120 may be placed on the upper surface of the main body 100 and the liquid leakage sensing unit 150*a* may be placed on and protruded from a lower surface of the main body 100. Also, the main body 100 may be equipped with a built-in rechargeable battery 140 configured to accumulate electric power collected by the solar module 120.

The solar module 120 may convert light inside the plant or the like into electric energy and recharge the rechargeable battery 140. The electric power is collected by the solar module 120 using conventionally known technologies, such as a power collection device or a power storage device. Therefore, a detailed description thereof will be omitted.

When a chemical material leaks from a plant facility, the chemical material (liquid) may be brought into contact with the circuit through the groove formed in the lower surface of the film of the liquid leakage sensing unit 150*a* and the resistance value of the circuit may change. For example, both ends of the circuit may be connected to the controller 20, and when the controller 20 checks that the resistance value of the circuit increases to be higher than a threshold value, the controller 20 may transmit a material leakage notification to the security company device 30.

If the material leakage sensor 10 is configured as a device for sensing gas leakage, it may be configured as described below.

Referring to FIG. 7, the material leakage sensor 10 may include a main body 100 having opening 101 to penetrate one end and the other end of the main body 100, a camera module 130 placed on an inner surface of the main body 100, a gas leakage sensing unit 150*b* placed to face the camera module 130 and formed as a substrate and a photocatalytic material applied to the substrate, and an optical module 135 placed adjacent to the camera module 130 and configured to emit light toward the gas leakage sensing unit 150*b*.

For example, the main body 100 may have a box shape with the opening 101 on one side and the other side, respectively. The camera module 130 may be placed on one inner surface of the main body 100, and the gas leakage sensing unit 150*b* may be placed on the other inner surface of the main body 100 to face the camera module 130. In this case, the optical module 135 may be placed adjacent to the camera module 130 and may emit light toward the gas leakage sensing unit 150*b*.

The gas leakage sensing unit 150*b* may be formed as a substrate and a photocatalytic material applied to the substrate. In this case, when the photocatalytic material is in contact with a leaked gas, the color of the photocatalytic material may change. For example, the photocatalytic material may change in color depending on the acidity or basicity of the gas. Thus, it is possible to verify the type of the leaked gas. Further, the substrate may be made of paper, but is not limited thereto.

For example, the gas leakage sensing unit 150*b* may be placed on the right inner surface or left inner surface of the main body 100, but is not limited thereto, and may be placed on an upper surface or lower surface of the main body 100. In this case, the camera module 130 configured to take pictures of the gas leakage sensing unit 150*b* may be placed opposite the gas leakage sensing unit 150*b*.

The camera module 130 may continuously take pictures of the substrate of the gas leakage sensing unit 150*b* and may transmit photography information to the controller 20. For example, the photography information may be stored with low resolution which makes the color of the substrate of the gas leakage sensing unit 150*b* recognizable. Thus, it is possible to reduce the storage capacity for the photography information.

The optical module 135 may be placed to emit light toward the gas leakage sensing unit 150, and, thus, the camera module 130 can take a picture of color change of the gas leakage sensing unit 150*b* even in dark environments.

The controller 20 may check the photography information received from the camera module 130 in real time to check a color change of the gas leakage sensing unit 150*b*. If the gas leakage sensing unit 150*b* changes in color, the controller 20 may transmit a material leakage notification to the security company device 30.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A system for sensing and notifying material leakage, comprising:
   a material leakage sensor provided as plural ones within a specific facility and configured to:
   sense whether a material including a liquid or a gas leaks to the outside of a joint portion or an opening/closing portion of the equipment located inside the specific facility; and
   a controller configured to:
   receive sensing information sensed by the material leakage sensor and transmit a material leakage notification to a security company device through a wireless communication module based on the sensing information,
wherein the security company device is a device of a security company in charge of security or guard for the specific facility,
the material leakage sensor is further provided as being wire connected to the controller and is further configured to:
  transmit the sensing information to the controller,
  wherein the sensing information includes a leakage recognition value detected when the leakage of material is sensed,
the controller is further configured to:
  receive response-to-error information multiple times whenever a security company manager which possesses the security company device verifies that the material leakage notification is an error, and
  match the multiple response-to-error information received with leakage recognition values corresponding to the material leakage notifications and then store them.

2. The system for sensing and notifying material leakage of claim 1,
wherein the security company device is specified as a mobile device of a staff member of the security company in charge of security or guard, and
the security company device which receives the material leakage notification is configured to display a message of the material leakage notification and also provide the notification by at least one of vibration and sound.

3. The system for sensing and notifying material leakage of claim 1,
wherein the sensing information includes a leakage recognition value detected when the leakage of material is not sensed.

4. The system for sensing and notifying material leakage of claim 1, wherein the leakage recognition value includes at least one of a current value and a voltage value of the material leakage sensor.

5. The system for sensing and notifying material leakage of claim 1 wherein when the controller receives a leakage recognition value matched with the response-to-error information from the material leakage sensor, the controller is configured not to transmit the material leakage notification to the security company device.

6. The system for sensing and notifying material leakage of claim 1, further comprising:
a management server configured to receive the sensing information and match the sensing information with predetermined material leakage notification information and transmit them to the security company device; and
a plant manager device configured to receive GPS information of the security company device in real time,
wherein the material leakage notification information includes a command signal to transmit a GPS module operation command signal, a vibration command signal, and GPS information to the management server.

7. The system for sensing and notifying material leakage of claim 6,
wherein when the management server receives result information including scene control and response to error from the security company device, the management server is configured to transmit the result information to the plant manager device.

8. The system for sensing and notifying material leakage of claim 1,
wherein the management server is configured to match the sensing information with location information of the material leakage sensor that senses the leakage of material and information about a structure in which the material leakage sensor is located and store them in a database, and
the information about the structure includes the type, age, and location of the structure.

9. The system for sensing and notifying material leakage of claim 8,
wherein the management server is configured to transmit, to the plant manager device, material leakage analysis information analyzed based on the sensing information, the response-to-error information, the location information of the material leakage sensor, and the structure information, and
the material leakage analysis information includes the frequency of occurrence of errors according to a type, an age, and location of the structure.

10. The system for sensing and notifying material leakage of claim 1,
wherein the material leakage sensor incudes:
a solar module placed on an upper surface of a main body; and
a liquid leakage sensing unit including a film protruding to the outside from a lower part of the main body and covering a circuit and a groove formed in a lower surface of the film to expose the circuit to the outside.

11. The system for sensing and notifying material leakage of claim 1,
wherein the material leakage sensor includes:
a main body having opening to penetrate one end and the other end of the main body;
a camera module placed on an inner surface of the main body;
a gas leakage sensing unit placed to face the camera module and having a substrate and a photocatalytic material applied to the substrate; and
an optical module placed adjacent to the camera module and configured to emit light toward the gas leakage sensing unit.

12. The system for sensing and notifying material leakage of claim 6,
wherein the management server is configured to periodically receive, from the material leakage sensor, live signals indicating that the material leakage sensor normally operates, and
when the management server receives, from the security company device, a request for retrieval of the status of the material leakage sensor, the management server is configured to transmit status information of the material leakage sensor to the security company device based on the live signals of the material leakage sensor selected by the security company device.

13. A system for sensing and notifying material leakage, comprising:
a controller configured to:
  receive sensing information from a material leakage sensor, which is provided as plural ones within a specific facility and configured to sense whether a material including a liquid or a gas leaks to the outside of a joint portion or an opening/closing portion of the equipment located inside the specific facility, and transmit a material leakage notification to a security company device through a wireless communication module based on the sensing information,
wherein the security company device is a device of a security company in charge of security or guard for the specific facility, and
the material leakage sensor includes:
  a main body having opening to penetrate one end and the other end of the main body;
  a camera module placed on an inner surface of the main body;
  a gas leakage sensing unit placed to face the camera module and having a substrate and a photocatalytic material applied to the substrate; and
  an optical module placed adjacent to the camera module and configured to emit light toward the gas leakage sensing unit.

* * * * *